(12) United States Patent
Schmidt

(10) Patent No.: US 9,714,645 B2
(45) Date of Patent: Jul. 25, 2017

(54) DIFFERENTIAL CYLINDER FOR A HYDROMECHANICAL DRIVE FOR ELECTRICAL CIRCUIT BREAKERS

(71) Applicant: ABB Technology AG, Zürich (CH)

(72) Inventor: Matthias Schmidt, Frankfurt (DE)

(73) Assignee: ABB Schweiz AG, Baden (CH)

( * ) Notice: Subject to any disclaimer, the term of this patent is extended or adjusted under 35 U.S.C. 154(b) by 375 days.

(21) Appl. No.: 14/171,505

(22) Filed: Feb. 3, 2014

(65) Prior Publication Data
US 2014/0144315 A1 May 29, 2014

Related U.S. Application Data

(63) Continuation of application No. PCT/EP2012/003168, filed on Jul. 26, 2012.

(30) Foreign Application Priority Data

Aug. 3, 2011 (DE) .................. 10 2011 109 227

(51) Int. Cl.
*F04B 19/22* (2006.01)
*H01H 33/34* (2006.01)
(Continued)

(52) U.S. Cl.
CPC ............. *F04B 19/22* (2013.01); *F16F 9/49* (2013.01); *H01H 3/24* (2013.01); *H01H 3/605* (2013.01); *H01H 33/34* (2013.01)

(58) Field of Classification Search
CPC .... F15B 15/204; F15B 15/222; F15B 15/224; F15B 15/227
(Continued)

(56) References Cited

U.S. PATENT DOCUMENTS

| 1,971,048 | A | * | 8/1934 | Parsons | F01B 17/00 29/888.061 |
| 2,358,650 | A | * | 9/1944 | Maude | B30B 15/183 91/1 |
| 3,054,384 | A | * | 9/1962 | Darling | F15B 11/04 91/26 |
| 3,442,179 | A | * | 5/1969 | Comer | F15B 15/227 91/420 |
| 3,559,531 | A | * | 2/1971 | Leibfritz | F15B 15/223 137/454.5 |
| 3,608,437 | A | * | 9/1971 | Little | F15B 15/222 91/407 |
| 3,885,454 | A | * | 5/1975 | Grieger | H01H 3/605 200/82 B |
| 4,807,514 | A |   | 2/1989 | Gartzmuller | |
| 4,862,786 | A | * | 9/1989 | Boyer | F15B 15/22 277/560 |
| 5,309,817 | A | * | 5/1994 | Sims | F15B 15/227 92/85 A |
| 6,038,956 | A | * | 3/2000 | Lane | F15B 15/222 91/409 |

(Continued)

FOREIGN PATENT DOCUMENTS

| CH | 4413512 A1 * 10/1995 | ............ F15B 15/082 |
| CN | 102042280 A * 5/2011 | ............ F15B 15/222 |

(Continued)

OTHER PUBLICATIONS

International Search Report (PCT/ISA/210) mailed on Nov. 22, 2012, by the European Patent Office as the International Searching Authority for International Application No. PCT/EP2012/003168.
(Continued)

*Primary Examiner* — Thomas E Lazo
*Assistant Examiner* — Matthew Wiblin
(74) *Attorney, Agent, or Firm* — Barnes & Thornburg LLP

(57) ABSTRACT

A differential cylinder for a hydro-mechanical drive for actuating an electric switch, for example, a high-voltage switch, can include a first pressure area to be loaded with an operating pressure, a second pressure area, and a piston which can be moved in a movement range as a function of the pressure difference between the first and second pressure area. A damping device is provided which, during a movement of the piston in the direction of the second pressure area in one section of the movement range, provides damping against the movement of the piston, wherein the damping is adjustable.

22 Claims, 1 Drawing Sheet

(51) Int. Cl.
  *H01H 3/24* (2006.01)
  *H01H 3/60* (2006.01)
  *F16F 9/49* (2006.01)

(58) Field of Classification Search
  USPC .......................................... 91/396, 405, 407
  See application file for complete search history.

(56) References Cited

U.S. PATENT DOCUMENTS

| | | | |
|---|---|---|---|
| 6,776,356 B2 * | 8/2004 | Maliteare ............ | A01M 7/0075 239/163 |
| 2009/0020508 A1 | 1/2009 | Lohrberg et al. | |
| 2010/0206160 A1 * | 8/2010 | Jackson ................ | A61G 15/02 91/437 |

FOREIGN PATENT DOCUMENTS

| | | | | |
|---|---|---|---|---|
| DE | 19 25 166 A1 | 11/1970 | | |
| DE | 1925166 A1 * | 11/1970 | ............ | F15B 15/224 |
| DE | 1964076 A1 * | 6/1971 | ............ | F15B 15/204 |
| DE | 28 38 219 A1 | 3/1980 | | |
| DE | 31 23 169 A1 | 12/1982 | | |
| DE | 4401871 A1 * | 7/1995 | ............ | F15B 15/222 |
| DE | 44 04 834 A1 | 8/1995 | | |
| DE | 4404834 A1 * | 8/1995 | ............. | F16F 9/348 |
| DE | EP 1847720 A1 * | 10/2007 | ............ | F15B 11/044 |
| DE | EP 1988296 A1 * | 11/2008 | ............ | F15B 15/224 |
| DE | 10 2008 004063 A1 | 7/2009 | | |
| DE | WO 2009086906 A1 * | 7/2009 | ............. | H01H 33/34 |
| DE | 102008024157 A1 * | 11/2009 | ............ | F15B 15/204 |
| DE | 102009014817 A1 * | 9/2010 | ......... | F15B 15/1433 |
| DE | 10 2009 015 881 A1 | 10/2010 | | |
| SE | EP 1559918 A2 * | 8/2005 | ............ | F15B 15/082 |
| WO | WO 2009/086906 A1 | 7/2009 | | |
| WO | WO 2010/112130 A1 | 10/2010 | | |

OTHER PUBLICATIONS

International Search Report (PCT/ISA/210) mailed on Nov. 22, 2012, by the European Patent Office as the International Searching Authority for International Application No. PCT/EP2012/003167.

* cited by examiner

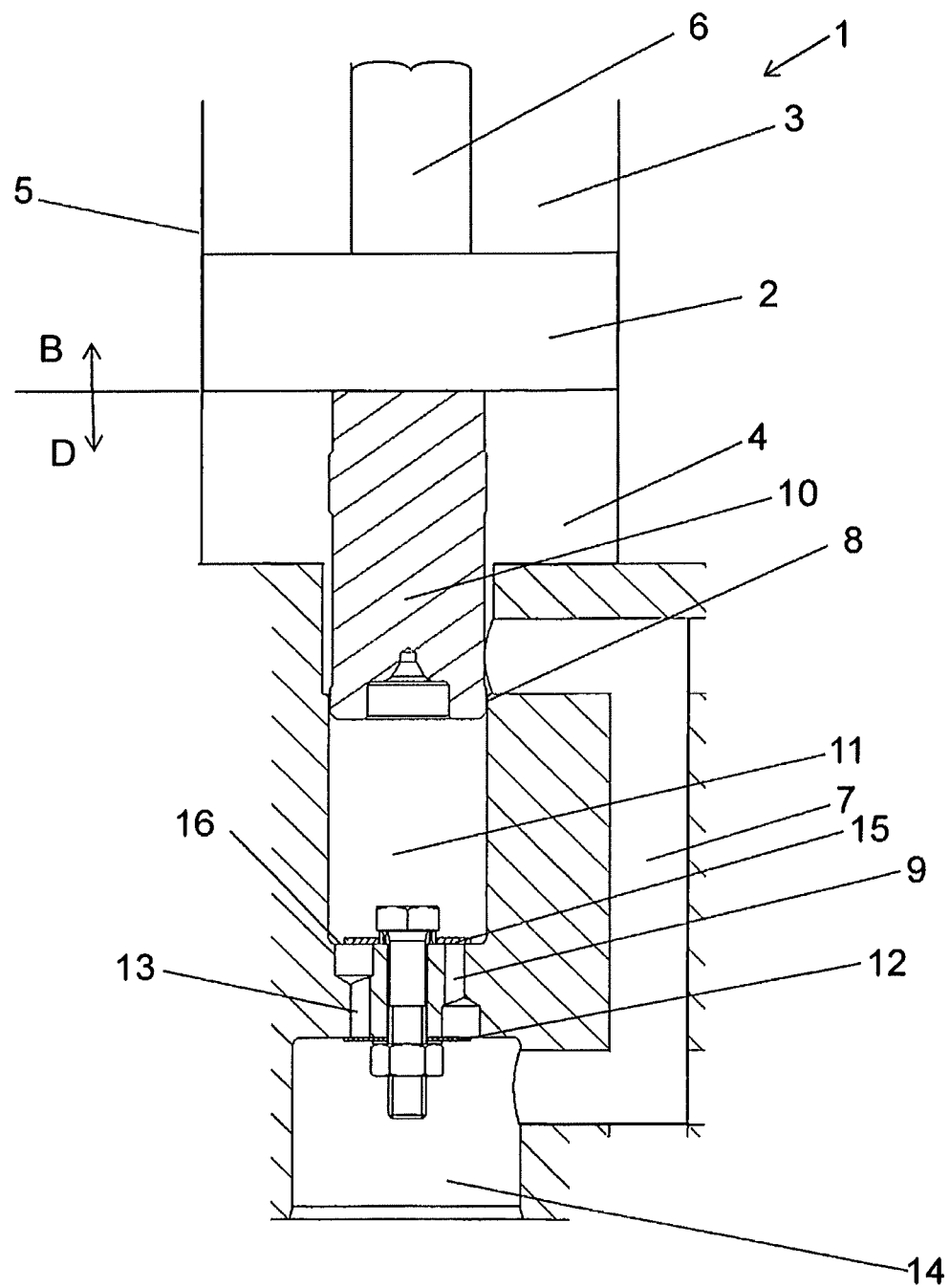

DIFFERENTIAL CYLINDER FOR A HYDROMECHANICAL DRIVE FOR ELECTRICAL CIRCUIT BREAKERS

RELATED APPLICATION(S)

This application claims priority as a continuation application under 35 U.S.C. §120 to PCT/EP2012/003168, which was filed as an International Application on Jul. 26, 2012 designating the U.S., and which claims priority to German Application 10 2011 109227.0 filed in Germany on Aug. 3, 2011. The entire contents of these applications are hereby incorporated by reference in their entireties.

FIELD

The disclosure relates to hydraulic differential cylinders for hydromechanical drives for electrical circuit breakers.

BACKGROUND INFORMATION

Hydromechanical stored-energy spring mechanisms can have differential cylinders. A piston of the differential cylinder is connected to a piston rod, which can be moved by pressurization of a pressure volume. The piston rod can be connected to an electrical circuit breaker, thus enabling the electrical circuit breaker to be switched by moving the piston rod. To open the electrical circuit breaker, for example, the pressure volume of the differential cylinder can be subjected to a hydraulic pressure, moving the piston rod into a corresponding position.

The pressure in the pressure volume can be supplied by a pressure cylinder, which can be coupled to a mechanical energy storage device, for example, a spring arrangement. If the circuit breaker is to be switched, the spring force on the pressure cylinder is released, with the result that a working pressure builds up there. This is also present via a hydraulic connection in the pressure volume of the differential cylinder. The working pressure in the pressure region can move the piston and the piston rod of the differential cylinder.

If the mechanical energy storage device on the pressure cylinder is designed as a spring arrangement, it can be subjected to a preload in order to provide a sufficient force. When the spring arrangement is triggered, the working pressure builds up very quickly, and therefore the pressure region of the differential cylinder can be subjected almost immediately to the working pressure. As a result, the piston of the differential cylinder can be moved in the direction of an end stop with a high acceleration force. To protect the differential cylinder and the other mechanical components coupled thereto, end position damping can be provided, in which the speed of the piston can be reduced before it or some other component strikes a stop. Damping is intended to ensure that the final speed of the piston upon impact is brought below a predetermined threshold in order to avoid damage to the components.

Depending on the application and on the type of circuit breaker to be switched, on the trigger speed, the working pressure provided and the like, a specific geometrical design of the damping can be devised for each individual application. As a result, the hydromechanical stored-energy spring mechanisms can be already tied to a particular use at the beginning of manufacture. It is difficult to change the area of application after their production. This makes the production of hydromechanical stored-energy spring mechanisms inflexible because they may only be produced specifically for a particular application and it may not be possible to produce them as reserve stock for a number of undefined uses and to adapt them to the given application after their production.

It is therefore desirable to provide a hydromechanical stored-energy spring mechanism which has end position damping that enables retardation in such a way that a final speed of the piston rod below a predetermined threshold is achieved before the piston, the piston rod or a component connected thereto strikes an end stop, irrespective of the working pressure supplied by the mechanical energy storage device and irrespective of the mass moved by the piston rod.

SUMMARY

A differential cylinder for a hydromechanical drive for actuating an electrical switch is disclosed, comprising: a first pressure region for supplying with a working pressure; a second pressure region; a piston, having a range of movement and which is movable depending on a pressure difference between the first and second pressure regions; a damping device which, in an event of a movement of the piston in a direction of the second pressure region, provides damping with respect to the movement of the piston in a section of the range of movement, the damping being set automatically, the damping device including: a damping chamber, having a plurality of oil passages arranged at a bottom; and a closure element, which is clamped securely in place and has spring properties, being arranged underneath the oil passages, the closure element clamped securely in place being subjected to a prevailing damping pressure on an oil passage, of the plurality of oil passages, closed by it, for regulating the damping pressure.

A hydromechanical drive for a high-voltage circuit breaker is disclosed comprising: a differential cylinder for activating an electrical switch, the differential cylinder including: a first pressure region for supplying with a working pressure; a second pressure region; a piston, having a range of movement and which is movable depending on a pressure difference between the first and second pressure regions; a damping device which, in an event of a movement of the piston in a direction of the second pressure region, provides damping with respect to the movement of the piston in a section of the range of movement, the damping being set automatically, the damping device including: a damping chamber, having a plurality of oil passages arranged at a bottom; and a closure element, which is clamped securely in place and has spring properties, being arranged underneath the oil passages, the closure element clamped securely in place being subjected to a prevailing damping pressure on an oil passage, of the plurality of oil passages, closed by it, for regulating the damping pressure.

BRIEF DESCRIPTION OF THE DRAWINGS

Exemplary embodiments of the present disclosure are explained in greater detail below with reference to the attached drawings, in which:

FIG. 1 shows a schematic cross-sectional view through a hydraulic differential cylinder having end position damping in accordance with an exemplary embodiment.

DETAILED DESCRIPTION

Exemplary embodiments of the present disclosure are directed to a hydromechanical drive for actuating an electrical circuit breaker in which the level of end position damping is regulated.

According to an exemplary embodiment of the disclosure, a differential cylinder for a hydromechanical drive for actuating an electrical switch, for example a high-voltage switch, is provided.

Exemplary embodiments of the differential cylinder include a first pressure region for supplying with a working pressure, a second pressure region, a piston, which is movable in a range of movement and which is movable depending on a pressure difference between the first and second pressure regions. A damping device is provided which, in the event of a movement of the piston in the direction of the second pressure region, provides damping, also referred to as end position damping, with respect to the movement of the piston in a section of the range of movement, wherein the damping is set automatically.

The damping device has a damping chamber, at the bottom of which oil passages are arranged. A closure element, which can be clamped securely in place, has spring properties, is subjected to a prevailing damping pressure on the oil passage closed by it and regulates the damping pressure, is arranged underneath the oil passages.

An exemplary embodiment of the differential cylinder for a hydromechanical drive according to the disclosure includes providing damping of a movement of the piston in a section (partial range) of the range of movement of the piston in order to reduce the speed of the piston before it reaches an end stop.

By providing automatically set damping, it can be possible to design the differential cylinder independently of knowledge as to the subsequent system in which it is used.

In this way, very largely application-neutral manufacture of hydromechanical drives of this kind can be possible without knowing the final use.

Exemplary embodiments of the damping device according to the disclosure have a damping chamber at an opposite end of the second pressure region from the piston and can have a damping pin projecting on the piston in the direction of the second pressure region. The damping pin and the damping chamber are arranged such that the damping pin projects into the damping chamber in a section of the range of movement and thus separates the second pressure region from the damping chamber.

It can be possible to ensure that no significant damping is caused in a first section of the range of movement of the piston. Only in a second section of the range of movement, when the damping pin enters a damping chamber due to the movement of the piston, is the fluid situated in the damping chamber enclosed, with the result that it can flow out of the damping chamber only through a reduced passage cross section. As a result, there is a significant increase in damping with respect to the movement of the piston in the first piston region.

According to an exemplary embodiment of the present disclosure, the cross section through which the hydraulic fluid can flow out of the damping chamber can be set automatically. This enables the hydromechanical drive to be adjusted to the application, i.e. to the initial speed of the piston, the force acting on the piston, the maximum speed of the piston and the mass of the elements connected to the piston rod, without external intervention, in order to achieve the desired switching behavior of the circuit breaker actuated by the hydromechanical drive.

For this purpose, the damping pin and the damping chamber are designed in such a way that, after the penetration of the damping pin into the damping chamber, there remains a residual gap, which has a predetermined passage cross section.

For example, the predetermined passage cross section can be chosen in such a way that it brings about a predetermined maximum damping with respect to the movement of the piston.

According to an exemplary embodiment of the disclosure, a closure element, for example a disk-shaped element, which can be moved in an axial direction with respect to the direction of movement of the piston, can be arranged at the bottom of the damping chamber and, in the event of a movement of the piston in the direction of the second pressure region into the section of the range of movement, changes the cross section of passages for a hydraulic fluid, also referred to below as oil passages, situated or arranged therebelow.

In an exemplary embodiment of the disclosure, the cross section of at least one of the oil passages can be arranged such that, in the event of a movement of the piston in the direction of the second pressure region, the closure element closes the oil passage. The cross section of at least one of the further oil passages can be arranged such that the disk-shaped element does not fully close this oil passage, and hence a gap is formed, through which the hydraulic fluid can flow.

Here, the movable disk-shaped element and the oil passage, which is closed by the movable closure element, act as a check valve, and the movable disk-shaped element thus brings about damping with respect to the movement of the piston by the axially movable disk-shaped element being pressed against the bottom of the damping chamber.

A closure element, for example a spring washer, can be clamped securely in place and can be disk shaped, is arranged underneath the passages for the hydraulic fluid. The element clamped securely in place has spring properties and can be pressed onto the oil passages closed by it by a prevailing damping pressure. The closure element clamped securely in place thus advantageously regulates the damping pressure.

In the event of a movement of the piston in the direction of the second pressure region, the damping pressure is thus applied to the oil passages closed by the disk-shaped element clamped securely in place.

If the force on the surface of the disk-shaped element clamped securely in place increases, the disk-shaped element clamped securely in place can bend downward and expose a cross section through which hydraulic fluid can flow off into a tank port connected to the passages for the hydraulic fluid and leading to a hydraulic fluid container. The higher the damping pressure, the larger is the cross section exposed. If the damping pressure falls due to an increased outflow of hydraulic fluid, the flexure of the disk-shaped element clamped securely in place is also reduced, and the free cross section is reduced again. Retardation of the piston can thus be achieved without exceeding a particular maximum pressure.

When the piston moves in the opposite direction (out of the damping chamber), the axially freely movable disk-shaped element rises and exposes the maximum cross section. The hydraulic fluid can thus flow unhindered into the damping chamber, and the acceleration of the piston is not hindered. Here, the disk-shaped element clamped securely in place acts as a one-way restrictor in conjunction with the oil passage, which is closed at its end facing toward the tank port by the disk-shaped element clamped securely in place.

In an exemplary embodiment of the differential cylinder according to the disclosure, two passages for the hydraulic fluid can be provided, but the number of oil passages can also be greater.

The oil passages can be each made up of a first and a second subregion, wherein the first subregion of the oil passage, which is not fully closed by the movable disk-shaped element, has a larger cross section than the second subregion thereof, which is covered by the resilient element clamped securely in place.

The first subregion of the oil passage, which is fully closed by the movable disk-shaped element, has a smaller cross section than the second subregion thereof, which is covered by the resilient element clamped securely in place.

According to an exemplary embodiment of the disclosure, a hydromechanical drive having the above differential cylinder can be provided, for example used in high-voltage circuit breakers.

FIG. 1 shows a schematic cross-sectional view of a hydraulic differential cylinder 1 having a piston 2, which separates a first pressure region 3 from a second pressure region 4. The piston 2 is arranged movably in a cylinder interior 5, wherein the piston 2 separates the first and the second pressure region 3, 4 hermetically from one another. The first pressure region 3 can be supplied with a working pressure.

The working pressure can, for example, be supplied by a separate pressure cylinder and can be exerted on a piston 2 of the pressure cylinder by the release of a mechanical energy storage device, for example a preloaded diaphragm or helical spring.

The hydraulic differential cylinder 1 serves to provide a triggering movement. For this purpose, the piston 2 of the differential cylinder 1 is connected to a piston rod 6, which brings about opening and closure of an electrical circuit breaker directly or indirectly as an actuator.

When the working pressure is acting in the first pressure region 3, the piston 2 moves in accordance with the pressure difference between the first and the second pressure region 3, 4 in such a way that the volume of the second pressure region 4 can decrease. The hydraulic fluid situated in the second pressure region 4 flows off via the hydraulic line 7 directly into a hydraulic fluid container and therefore does not exert any significant counterpressure on the piston 2. When the hydromechanical drive is triggered, the piston 2 of the differential cylinder 1 is accelerated, wherein the second pressure region 4 does not contribute to reducing the speed of the piston 2. In this way, a switching operation performed with the aid of the hydromechanical drive can be carried out at a desired speed, thus allowing rapid triggering operations.

The piston 2 of the differential cylinder 1 or a component connected thereto, which is accelerated by the triggering operation, can be prevented from striking an end stop without being retarded because the stop can be damaged as a result and, in addition, troublesome noise can arise. For this reason, end position damping is provided. The end position damping is formed with the aid of a cylindrical, for example circular-cylindrical, damping pin 10, which is passive during a movement of the piston 2 in a range B of movement in the interior 5 and brings about damping of the movement of the piston 2 as soon as the piston 2 is moving in a damping range D as the volume of the second pressure region 4 is reduced further. The position which represents the transition between the range B of movement and the damping region D is defined by the entry of the damping pin 10 into a likewise cylindrical damping chamber 11 as the volume of the second pressure region 4 is reduced.

The damping chamber 11 and the damping pin 10 have cross sections which leave a residual gap 8 when the damping pin 10 penetrates into the damping chamber 11, through which gap hydraulic fluid can emerge from the damping chamber 11 into the second pressure region 4. In this way, a restrictor effect is provided by the residual gap 8 because the hydraulic fluid enclosed in the damping chamber 11 can pass via the second pressure region 4 into the hydraulic fluid container.

Apart from the residual gap 8, the hydraulic line 7 for carrying the hydraulic fluid out of the second pressure region 4 is thus no longer in direct fluid connection with the hydraulic fluid enclosed in the damping chamber 11.

To ensure this, the cross section of the damping pin 10 is made less than the cross section of the damping chamber 11 in order to ensure the residual gap 8 for the passage of hydraulic fluid. The effective passage cross section of the residual gap can be chosen so that damping of the movement of the piston 2 with a maximum damping that can be set is made possible. The maximum damping that can be set can be predetermined during the design of the hydraulic drive, for example. Thus, for example, a passage cross section of 0.5% to 5% of the cross-sectional area of the damping pin 10 can be possible.

A closure element 15, which can be moved in the axial direction with respect to the direction of movement of the piston 2 and which can be embodied as a disk-shaped element or a spherical element, is arranged at the bottom of the damping chamber 11. The movable closure element 15 can be for example, a movable spring washer. The movable closure element 15 changes the cross section of oil passages 9, 13 situated or arranged therebelow during a movement of the piston 2 in the direction of the second pressure region 4 into section D of the range of movement.

The cross section of the oil passage 9 is designed in such a way that the movable disk-shaped element 15 closes the oil passage 9 in the event of a movement of the piston 2 in the direction of the second pressure region. The cross section of the further oil passage 13 is arranged such that the movable disk-shaped element 15 does not fully close this further oil passage 13, and hence a gap 16, through which the hydraulic fluid can flow, is formed.

Here, the movable disk-shaped element 15 and the oil passage 9, which is fully closed by the movable disk-shaped element 15, act as a check valve, and the movable disk-shaped element 15 brings about damping with respect to the movement of the piston 2 by virtue of the fact that the axially movable disk-shaped element 15 is pressed against the bottom of the damping chamber 11. As a result, the oil passage 9 serving as a check valve in conjunction with the movable disk-shaped element 15 is closed.

A closure element 12 clamped securely in place, for example, a spring washer or resilient disk-shaped element, is arranged underneath the oil passages 9, 13 for the hydraulic fluid.

When a damping pressure is applied, the spring washer 12 is pressed onto the oil passage 13 closed by it, with the result that the damping pressure is applied to the passage 13 closed by the spring washer 12.

The oil passages 9, 13 are each made up of a first and a second subregion, wherein the first subregion of oil passage 13 is not fully closed by the movable disk-shaped element 15 and has a larger cross section than the second subregion thereof, which is covered by the resilient element 12 clamped securely in place.

The first subregion of oil passage 9, which is fully closed by the movable disk-shaped element 15, has a smaller cross section than the second subregion thereof, which is partially covered by the resilient element 12 clamped securely in place.

When the force on the surface of the spring washer 12 increases, it bends downward and exposes a cross section through which hydraulic fluid can flow off into a tank port 14 connected to the oil passage 13 and leading to a hydraulic fluid container.

The higher the damping pressure, the larger is the cross section exposed. If the damping pressure falls due to an increased outflow of oil, the flexure of the spring washer 12 is also reduced, and the free cross section is reduced again. Retardation of the piston 2 is thus achieved without exceeding a particular maximum pressure.

When the piston 2 is moved in an opposite direction out of the damping chamber, the axially freely movable spring washer 15 rises, moves in the direction of the piston 2 and, in doing so, exposes the maximum cross section of the passages 9, 13 for the hydraulic oil.

Through the provision, at the bottom of the damping chamber 11, of a disk-shaped element 15 which can be moved in the axial direction with respect to the movement of the piston 2 and which serves as a top cover for the passage 9 for the hydraulic fluid and for the disk-shaped element 12, clamped securely in place, underneath the oil passages 9, 13, damping of the piston 2 is set automatically, and therefore the differential cylinders can be manufactured independently of the application.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 1 differential cylinder
2 piston
3 first pressure region
4 second pressure region
6 piston rod
7 hydraulic line
8 residual gap
9 oil passage for an unhindered upward movement of the damping pin
10 damping pin
11 damping chamber
12 closure element clamped securely in place, disk-shaped element clamped securely in place, spring washer clamped securely in place
13 oil passage with variable cross section for damping
14 tank port leading to a hydraulic fluid container
15 movable closure element, disk movable in an axial direction, movable spring washer
16 gap

What is claimed is:

1. A differential cylinder for a hydromechanical drive for actuating an electrical switch, comprising:
   a first pressure region for supplying with a working pressure;
   a second pressure region;
   a piston, having a range of movement and which is movable depending on a pressure difference between the first and second pressure regions;
   a damping device which, in an event of a movement of the piston in a direction of the second pressure region, provides damping with respect to the movement of the piston in a section of the range of movement, the damping being set automatically, the damping device including:
   a damping chamber, having a side wall and a bottom wall;
   a plurality of oil passages arranged in the bottom wall, the plurality of oil passages including a first oil passage and a second oil passage; and
   a first closure element provided for regulating a damping pressure, the first closure element being clamped securely in place at an end of the plurality of oil passages facing away from the damping chamber such that the first closure element partially closes the first oil passage and closes the second oil passage until the damping pressure in the second oil passage increases, the first closure element having spring properties for regulating the damping pressure.

2. The differential cylinder as claimed in claim 1, wherein the first closure element clamped securely in place is a spring washer.

3. The differential cylinder as claimed in claim 1, wherein the damping chamber is arranged at an opposite end of the second pressure region from the piston, and wherein the damping device comprises:
   a damping pin projecting on the piston in the direction of the second pressure region, wherein the damping pin and the damping chamber are arranged such that the damping pin projects into the damping chamber in the section of the range of movement and thus separates the second pressure region from the damping chamber.

4. The differential cylinder as claimed in claim 3, wherein the damping pin and the damping chamber are arranged such that, after the penetration of the damping pin into the damping chamber, there remains a residual gap, which has a predetermined passage cross section.

5. The differential cylinder as claimed in claim 4, wherein the predetermined passage cross section is arranged such that it brings about a predetermined maximum damping with respect to the movement of the piston.

6. The differential cylinder as claimed in claim 5, wherein the second closure element and the oil passages, which is fully or partially closed by the first closure element, act as check valves.

7. The differential cylinder as claimed in claim 5, further comprising:
   a second closure element wherein a cross section of the first oil passage is arranged such that, in the event of a movement of the piston in the direction of the second pressure region, the second closure element closes the first oil passage, and wherein a cross section of the second oil passage is arranged such that the second closure element does not fully close the second oil passage and forms a gap through which hydraulic fluid flows.

8. The differential cylinder as claimed in claim 7, wherein the second closure element and the oil passages, which are fully or partially closed by the first closure element, act as check valves.

9. The differential cylinder as claimed in claim 3 further comprising:
   a hydraulic fluid container arranged at the end of the plurality of oil passages facing away from the damping chamber; and
   a hydraulic line fluidly connecting the second pressure region to the hydraulic fluid container;

wherein, when the damping pin projects into the damping chamber, the damping pin also separates the damping chamber from the hydraulic line.

10. The differential cylinder as claimed in claim 1, wherein the spring properties of the first closure element enable the first closure element to bend downwardly away from the second oil passage and expose a cross section through which hydraulic fluid flows when the damping pressure in the second oil passage increases, wherein a size of the cross section increases as the damping pressure increases.

11. A hydromechanical drive for a high-voltage circuit breaker comprising:
    a differential cylinder for activating an electrical switch, the differential cylinder including:
        a first pressure region for supplying with a working pressure;
        a second pressure region;
        a piston, having a range of movement and which is movable depending on a pressure difference between the first and second pressure regions;
        a damping device which, in an event of a movement of the piston in a direction of the second pressure region, provides damping with respect to the movement of the piston in a section of the range of movement, the damping being set automatically, the damping device including:
            a damping chamber, having a side wall and a bottom wall;
            a plurality of oil passages arranged in the bottom wall, the plurality of oil passages including a first oil passage and a second oil passage; and
            a first closure element provided for regulating a damping pressure, the first closure element being clamped securely in place at an end of the plurality of oil passages facing away from the damping chamber such that the first closure element partially closes the first oil passage and closes the second oil passage until the damping pressure in the second oil passage increases, the first closure element having spring properties for regulating the damping pressure.

12. The hydromechanical drive as claimed in claim 11, wherein the first closure element clamped securely in place is a spring washer.

13. The hydromechanical drive as claimed in claim 11, wherein a damping chamber is arranged at an opposite end of the second pressure region from the piston, and wherein the damping device comprises:
    a damping pin projecting on the piston in the direction of the second pressure region, wherein the damping pin and the damping chamber are arranged such that the damping pin projects into the damping chamber in the section of the range of movement and thus separates the second pressure region from the damping chamber.

14. The hydromechanical drive as claimed in claim 13, wherein the damping pin and the damping chamber are arranged such that, after the penetration of the damping pin into the damping chamber, there remains a residual gap, which has a predetermined passage cross section.

15. The hydromechanical drive as claimed in claim 14, wherein the predetermined passage cross section is arranged such that it brings about a predetermined maximum damping with respect to the movement of the piston.

16. The hydromechanical drive as claimed in claim 15, wherein the second closure element and the oil passages, which is fully or partially closed by the first closure element, act as check valves.

17. The hydromechanical drive as claimed in claim 15, comprising:
    a second closure element wherein a cross section of the first oil passage is arranged such that, in the event of a movement of the piston in the direction of the second pressure region, the second closure element closes the first oil passage, and wherein a cross section of the second oil passage is arranged such that the second closure element does not fully close the second oil passage and forms a gap through which hydraulic fluid flows.

18. The hydromechanical drive as claimed in claim 15, wherein the second closure element and the oil passages, which are fully or partially closed by the first closure element, act as check valves.

19. The hydromechanical drive as claimed in claim 13 further comprising:
    a hydraulic fluid container arranged at the end of the plurality of oil passages facing away from the damping chamber; and
    a hydraulic line fluidly connecting the second pressure region to the hydraulic fluid container;
    wherein, when the damping pin projects into the damping chamber, the damping pin also separates the damping chamber from the hydraulic line.

20. The hydromechanical drive as claimed in claim 11, wherein the spring properties of the first closure element enable the first closure element to bend downwardly away from the second oil passage and expose a cross section through which hydraulic fluid flows when the damping pressure in the second oil passage increases, wherein a size of the cross section increases as the damping pressure increases.

21. A differential cylinder for a hydromechanical drive for actuating an electrical switch, comprising:
    a first pressure region for supplying with a working pressure;
    a second pressure region;
    a piston, having a range of movement and which is movable depending on a pressure difference between the first and second pressure regions;
    a damping device which, in an event of a movement of the piston in a direction of the second pressure region, provides damping with respect to the movement of the piston in a section of the range of movement, the damping being set automatically, the damping device including:
        a damping chamber, having a side wall and a bottom wall;
        a plurality of oil passages arranged in the bottom wall, the plurality of oil passages including a first oil passage and a second oil passage;
        a first closure element provided for regulating a damping pressure, the first closure element being clamped securely in place at an end of the plurality of oil passages facing away from the damping chamber such that the first closure element partially closes the first oil passage and closes the second oil passage until the damping pressure in the second oil passage increases, the first closure element having spring properties; and
        a second closure element positioned at an end of the plurality of oil passages facing the damping chamber, the second closure element being configured to move in a direction away from the second pressure region such that the second closure element closes the first oil passage and partially closes the second oil passage, wherein in the event of a movement of the piston in a direction from the second pressure region towards the first pressure region, the second closure element rises off the first oil passage and exposes a maximum cross section of the first oil passage and the second oil passage.

22. The differential cylinder as claimed in claim 21, wherein the spring properties of the first closure element enable the first closure element to bend downwardly away from the second oil passage and expose a cross section through which hydraulic fluid flows when the damping pressure in the second oil passage increases, wherein a size of the cross section increases as the damping pressure increases.

\* \* \* \* \*